US010691678B2

(12) United States Patent
Astigarraga et al.

(10) Patent No.: US 10,691,678 B2
(45) Date of Patent: *Jun. 23, 2020

(54) CONSISTENT REPORTING USING BLOCKCHAIN

(71) Applicant: International Business Machines Corporation, Armonk, NY (US)

(72) Inventors: Tara Astigarraga, Fairport, NY (US); Yixin Diao, White Plains, NY (US); Ruchi Mahindru, Elmsford, NY (US); Karin Murthy, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/274,306

(22) Filed: Feb. 13, 2019

(65) Prior Publication Data
US 2019/0179817 A1 Jun. 13, 2019

Related U.S. Application Data

(63) Continuation of application No. 15/798,453, filed on Oct. 31, 2017, now Pat. No. 10,289,716.

(51) Int. Cl.
*G06F 16/242* (2019.01)
*G06F 16/903* (2019.01)
(Continued)

(52) U.S. Cl.
CPC ........ *G06F 16/2425* (2019.01); *G06F 16/903* (2019.01); *H04L 41/5006* (2013.01);
(Continued)

(58) Field of Classification Search
None
See application file for complete search history.

(56) References Cited

U.S. PATENT DOCUMENTS 7,188,100 B2 3/2007 Bellis
7,805,462 B2 9/2010 Dupont
(Continued)

FOREIGN PATENT DOCUMENTS

WO 2017027648 A1 2/2017

OTHER PUBLICATIONS

Astigarraga et al., "Consistent Reporting Using Blockchain", U.S. Appl. No. 15/798,453, filed Oct. 31, 2017, 28 pages.
(Continued)

*Primary Examiner* — Ryan M Gray
(74) *Attorney, Agent, or Firm* — William H. Hartwell (57) ABSTRACT

In an approach to achieving consistent reporting, one or more processors receive a request to include a set of data analysis and visualization parameters in a distributed ledger, such as the blockchain fabric distributed ledger. One or more processors may determine whether the set of data analysis and visualization parameters is consistent with a set of pre-determined rules recorded in the distributed ledger. One or more processors may additionally store the set of data analysis and visualization parameters in the distributed ledger responsive to determining that the set of data analysis and visualization parameters is consistent with the set of pre-determined rules recorded in the distributed ledger. One or more processors may further generate a report of a first dataset based on the set of data analysis and visualization parameters.

20 Claims, 6 Drawing Sheets

(51) Int. Cl.
*H04L 12/24* (2006.01)
*G06Q 40/06* (2012.01)
*H04L 12/26* (2006.01)
*G06F 16/28* (2019.01)

(52) U.S. Cl.
CPC ........ *H04L 41/5009* (2013.01); *G06F 16/283* (2019.01); *G06Q 40/06* (2013.01); *H04L 43/065* (2013.01)

(56) References Cited

U.S. PATENT DOCUMENTS

| | | |
|---|---|---|
| 7,870,046 B2 | 1/2011 | Gupta |
| 7,904,450 B2 | 3/2011 | Wilson |
| 8,260,822 B1 | 9/2012 | Braden |
| 8,571,961 B1 | 10/2013 | Dvorak |
| 9,298,806 B1 | 3/2016 | Vessenes |
| 2007/0143174 A1 | 6/2007 | Tien |
| 2009/0164386 A1 | 6/2009 | Greenfield |
| 2009/0287517 A1 | 11/2009 | Hall |
| 2015/0074053 A1 | 3/2015 | Sarferaz |
| 2015/0245084 A1 | 8/2015 | Downing |
| 2015/0332283 A1 | 11/2015 | Witchey |
| 2016/0098723 A1 | 4/2016 | Feeney |
| 2016/0259937 A1 | 9/2016 | Ford |
| 2016/0342978 A1 | 11/2016 | Davis |
| 2017/0032004 A1 | 2/2017 | Sarferaz |
| 2017/0046693 A1 | 2/2017 | Haldenby |
| 2017/0048216 A1 | 2/2017 | Chow |
| 2017/0255805 A1 | 9/2017 | Ebrahimi |
| 2017/0346693 A1* | 11/2017 | Dix ........................ H04L 9/3247 |
| 2017/0366416 A1* | 12/2017 | Beecham ................ H04L 41/12 |
| 2018/0114045 A1 | 4/2018 | Ebrahimi |
| 2018/0129957 A1 | 5/2018 | Saxena |
| 2018/0315141 A1 | 11/2018 | Hunn |
| 2018/0336202 A1 | 11/2018 | Jahanbakhsh |
| 2018/0350136 A1 | 12/2018 | Rowley |
| 2019/0012316 A1* | 1/2019 | Bahrie ................ G06F 16/2428 |
| 2019/0065686 A1* | 2/2019 | Crane ................... G16H 10/60 |

OTHER PUBLICATIONS

Crosby et al., "BlockChain Technology: Beyond Bitcoin", Applied Innovation Review, Issue No. 2, Jun. 2016, Pantas and Ting Sutardja Center for Entrepreneurship & Technology, Berkeley Engineering, 16 pages.

Finberg, Ron, "Blockchain technology for financial regulation reporting—Cappitech's analysis", Cappitech Blog, Sep. 5, 2016, 4 pages, <https://www.cappitech.com/blog/blockchain-technology-for-financial-regulation-reporting-cappitechs-analysis/>.

Sarr et al., "Blockchain-based Model for Social Transactions", In Proceedings of 4th International Conference on Data Management Technologies and Applications (DATA-2015), pp. 309-315, DOI: 10.5220/0005519503090315, ISBN: 978-989-758-103-8, Copyright © 2015 SCITEPRESS (Science and Technology Publications, Lda.).

IBM, "List of IBM Patents or Patent Applications Treated as Related", Appendix P, 2 pages, dated Feb. 15, 2019.

\* cited by examiner

CONSISTENT REPORTING USING BLOCKCHAIN

BACKGROUND OF THE INVENTION

The present invention relates generally to the field of data reporting, and more particularly to consistent reporting of derived data using a distributed ledger.

A blockchain is a distributed database that may be used as a distributed ledger including one or more data records storing one or more individual transactions or smart contracts. Generally, distributed ledgers are a shared, replicated, and permissioned ledger that acts as a system of record for businesses. Distributed ledgers provide unique characteristics that can be leveraged for recording transactions and/or contracts including conditions for transactions to occur. Moreover, distributed ledgers may also be used for enforcement of contractual agreements including verification and/or confirmation of performance of contract stipulations.

SUMMARY

Embodiments of the present invention disclose a method, a computer program product, and a system for achieving consistent reporting of derived data. The method may include one or more processors receiving a request to include a set of data analysis and visualization parameters in a distributed ledger. The method may also include one or more processors determining whether the set of data analysis and visualization parameters is consistent with a set of pre-determined rules recorded in the distributed ledger. The method may further include one or more processors storing the set of data analysis and visualization parameters in the distributed ledger responsive to determining that the set of data analysis and visualization parameters is consistent with the set of pre-determined rules recorded in the distributed ledger. The method may additionally include one or more processors generating a report of a first dataset based on the set of data analysis and visualization parameters.

DETAILED DESCRIPTION

It is common for different organizations to disagree over data reporting. For example, organizations may tend to report data in a fashion that is favorable to them while disregarding the needs of other organizations that depend on the reported data. Even if organizations agree on the same data input values (e.g., by sharing the data), the ways in which the data is summarized or plotted can still lead to disagreement between different organizations. In a globalized work environment, it is crucial to be as transparent as possible to avoid miscommunication between business parties and to keep the discussion and associated activities as clear as possible. Even a slight change in the metrics, display, and formulation can lead to confusion, conflicts, wasted effort and lack of trust between the parties involved.

In order to maintain transparency and consistency in data reports, the present disclosure utilizes a secure distributed ledger to store such data using a mutually agreed format. The mutually agreed format may include metrics, units, scales, display formats, rules, and legends, among other formats. Using a blockchain fabric distributed ledger allows automatic enforcement of the mutually agreed format between parties. For example, if one party does not follow the mutually agreed format, any affected party may open a dispute challenging the non-compliant visualization. The affected party will have clear data provenance and evidence of the mutually agreed format with respect to the non-compliant visualization.

Implementation of embodiments of the present invention may take a variety of forms, and exemplary implementation details are discussed subsequently with reference to the Figures.

Figure 1:
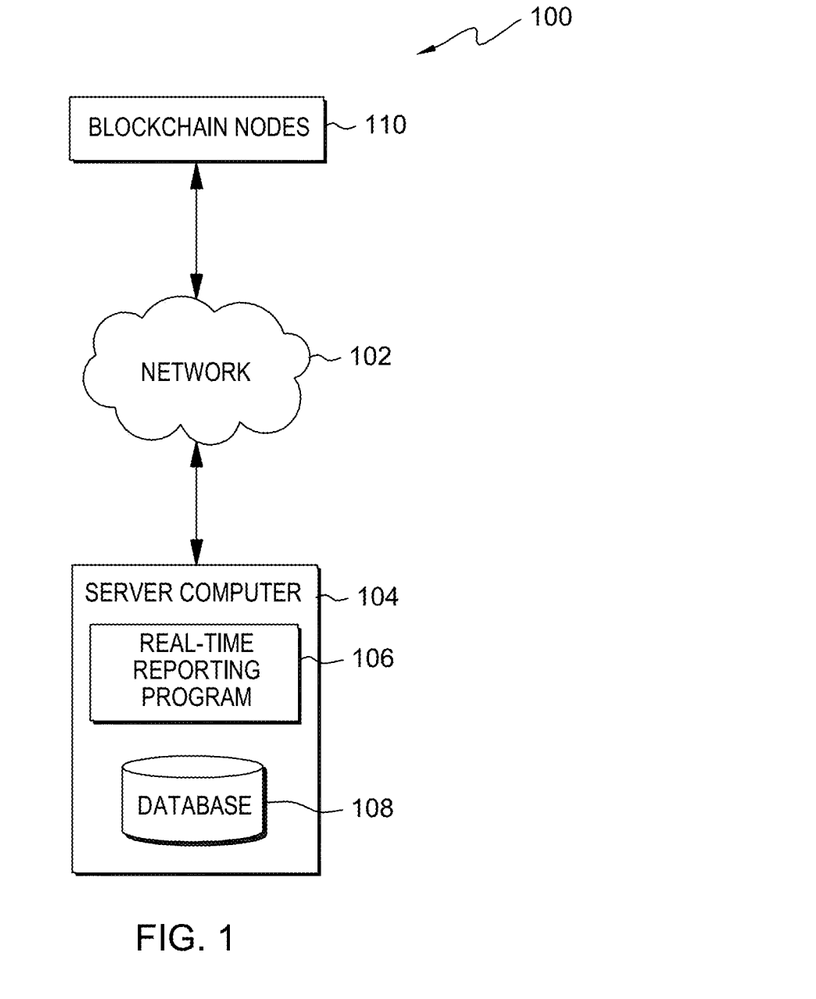
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104 and blockchain nodes 110, all interconnected over network 102.

In general, network 102 can be any combination of connections and protocols that will support communications between server computer 104 and blockchain nodes 110, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information.

Server computer 104 can be a standalone computing device, a management server, a content service, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating with blockchain nodes 110, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 may include internal and external hardware components, as depicted and described in further detail with respect to FIG. 6.

Database 108 is a repository for data used by real-time reporting program 106. Data used by real-time reporting program 106 may include one or more datasets for which at least one report is required. Data used by real-time reporting program 106 may also include derived data from one or more datasets stored in database 108. In the depicted embodiment, database 108 resides on server computer 104. In another embodiment, database 108 may reside elsewhere within distributed data processing environment 100 provided real-time reporting program 106 has access to database 108.

Blockchain nodes 110 include one or more computing nodes in a blockchain fabric distributed ledger using a blockchain protocol to share a transaction database.

Server computer 104 includes real-time reporting program 106 for consistent reporting of a first dataset based on a set of data analysis and visualization parameters stored in blockchain nodes 110. The first dataset may include data stored in database 108 and/or data stored in blockchain nodes 110. In some embodiments, receiving the set of data analysis and visualization parameters via blockchain nodes 110 enables data provenance and provides confidence to the parties relying on the reports. This objective is achieved by ensuring data consistency and consistency of data reports by leveraging a shared and agreed upon reporting structure.

Figure 2:
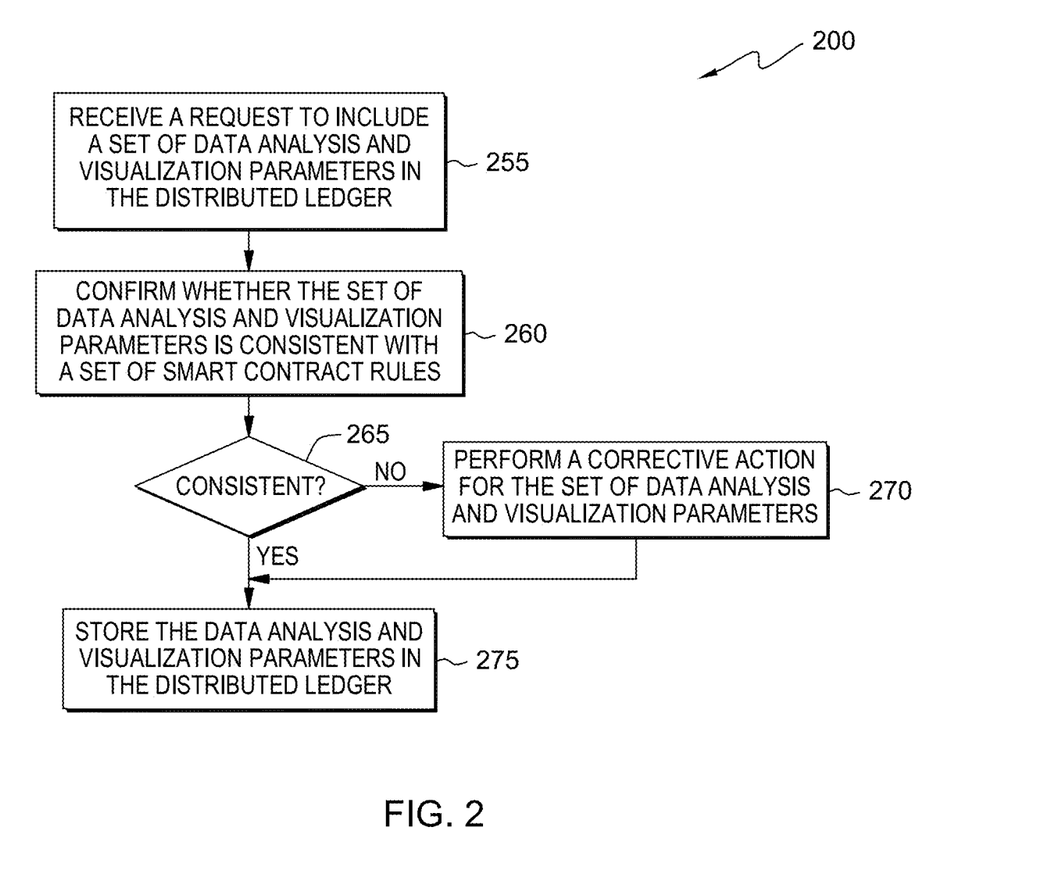
FIG. 2 is a flowchart depicting operational steps of a real-time reporting program for storing data analysis and visualization parameters for reporting of derived data, in accordance with an embodiment of the present invention.

Real-time reporting program 106 is depicted and described in further detail with respect to FIG. 2. Referring to flowchart 200, real-time reporting program 106 receives a set of data analysis and visualization parameters. If the set of data analysis and visualization parameters is consistent with a set of smart contract rules, real-time reporting program 106 stores the set of data analysis and visualization parameters in a distributed ledger.

Processing begins at operation 255, where real-time reporting program 106 receives a request to include a set of data analysis and visualization parameters in the distributed ledger. In some embodiments of the present invention, the set of data analysis and visualization parameters are based on a set of smart contract rules that are related to a smart contract recorded in the distributed ledger. In some embodiments, smart contracts enable the automation of business processes in a secure and decentralized manner. In some embodiments, the set of data analysis and visualization parameters includes parameters such as metrics, thresholds, collection periods, data validations, data derivations, data persistence, data purging, and reporting characteristics further including consistent axis, scale, and display criteria. In some embodiments, real-time reporting program 106 may suggest one or more data analysis and visualization parameters based on the set of smart contract rules. In some embodiments, the set of smart contract rules may be stored in database 108 and/or blockchain nodes 110.

Figure 4:
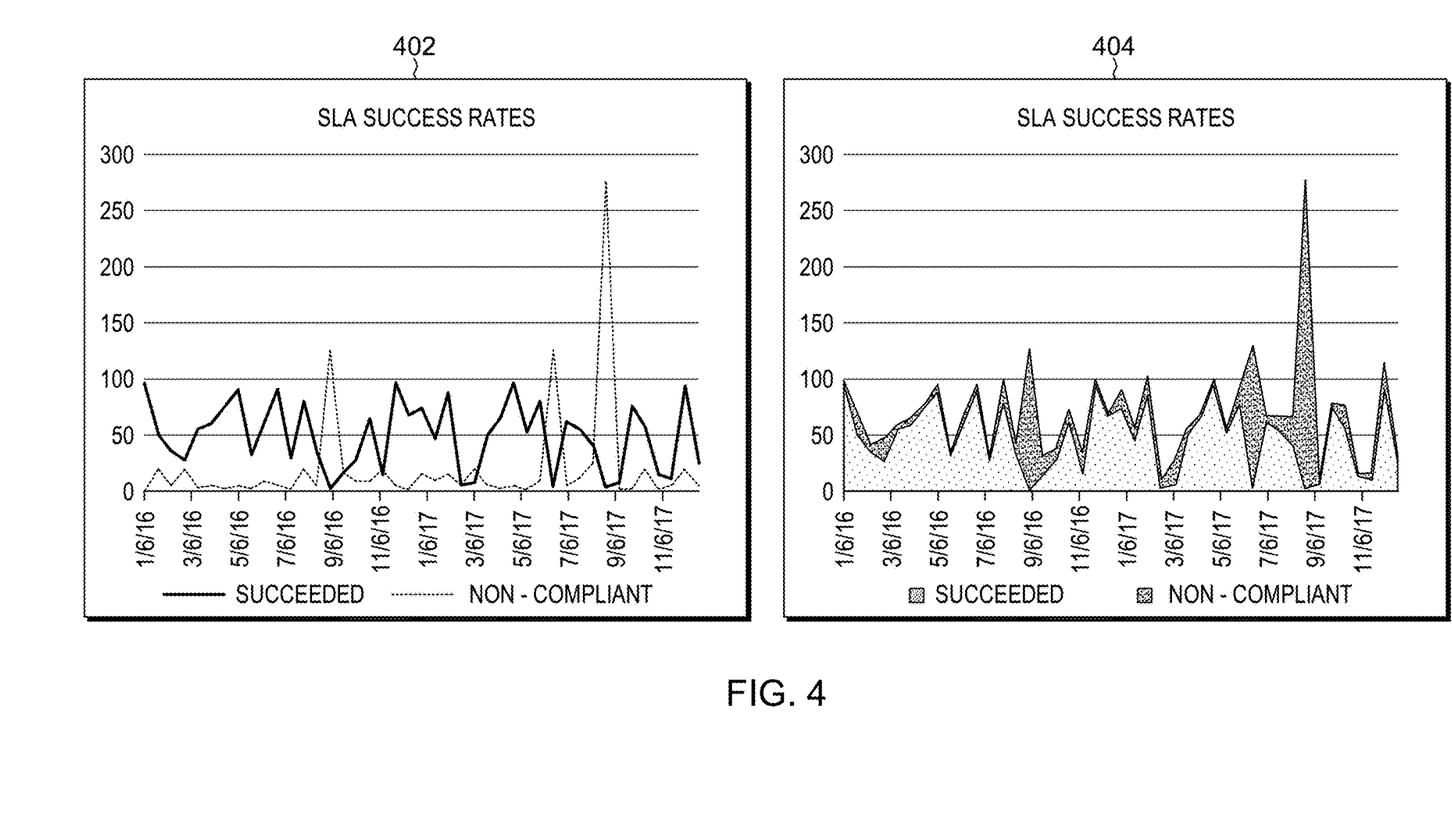
FIG. 4 are exemplary diagrams illustrating an aspect of data analysis and visualization parameters for reporting of derived data, in accordance with an embodiment of the present invention.

In an exemplary embodiment, Company A and Company X have executed a smart contract, stored in blockchain nodes 110, related to a service level agreement (SLA). Company A and Company X have further agreed to enforce the use of appropriate data analysis and visualization parameters by applying smart contract rules (e.g., automation of business logic) related to the smart contract. Company A and Company X share data on the SLA success rates through database 108 and/or blockchain nodes 110. Company A accesses real-time reporting program 106 to determine data analysis and visualization parameters for a chart corresponding to succeeded SLAs and non-compliant SLAs with respect to the date. Real-time reporting program 106 suggests chart 402 and chart 404 (see FIG. 4) for visualization of the desired data. In this example, Company A requests that chart 402 be included in the set of data analysis and visualization parameters stored in the distributed ledger.

Processing continues at operation 260, where real-time reporting program 106 confirms whether the set of data analysis and visualization parameters is consistent with a set of smart contract rules related to a smart contract recorded in the distributed ledger. In some embodiments of the present invention, real-time reporting program 106 confirms that the set of data analysis and visualization parameters are consistent with the set of smart contract rules by determining consensus of the distributed ledger stored in blockchain nodes 110. In some embodiments, blockchain nodes 110 perform consensus methods to ensure the distributed ledger is consistently synchronized. Continuing our exemplary embodiment, real-time reporting program 106 verifies consensus of the smart contract rules stored in blockchain nodes 110.

If the set of data analysis and visualization parameters is not consistent with the set of smart contract rules (operation 265, "no" branch), processing may continue at operation 270 where real-time reporting program 106 performs a corrective action for the set of data analysis and visualization parameters. In some embodiments of the present invention, real-time reporting program 106 may flag the set of data analysis and visualization parameters for dispute resolution in the distributed ledger. In some alternative embodiments (not shown in FIG. 2), inclusion of chart 402 may be rejected if there is no consensus for inclusion based on the set of smart contract rules. In the exemplary embodiment, if real-time reporting program 106 determines the set of data analysis and visualization parameters is not consistent with the set of smart contract rules, chart 402 is flagged for dispute resolution in the distributed ledger.

If the set of data analysis and visualization parameters is consistent with the set of smart contract rules (operation 265, "yes" branch), processing continues at operation 275, where real-time reporting program 106 stores the data analysis and visualization parameters in the distributed ledger. In some embodiments of the present invention, the data analysis and visualization parameters are stored as configuration parameters for real-time reporting program 106 or any other real-time reporting architecture. In other embodiments, the data analysis and visualization parameters are stored as a configuration file for real-time reporting program 106 or any other real-time reporting architecture. In other embodiments, the data analysis and visualization parameters may be represented by a unique identifier (UID) or a universally unique identifier (UUID). In some embodiments, the UID may be generated as a hash function of a configuration file containing the configuration parameters for real-time reporting program 106 or any other real-time reporting architecture.

Continuing the exemplary embodiment, if chart 402 is verified to be consistent with the smart contract rules, real-time reporting program 106 stores the set of data analysis and visualization parameters in blockchain nodes 110. In some embodiments, real-time reporting program 106 may generate a configuration file for a real-time reporting architecture including the set of data analysis and visualization parameters. In these and other embodiments, real-time reporting program 106 may store a UID or a UUID for the configuration file in blockchain nodes 110.

Figure 3:
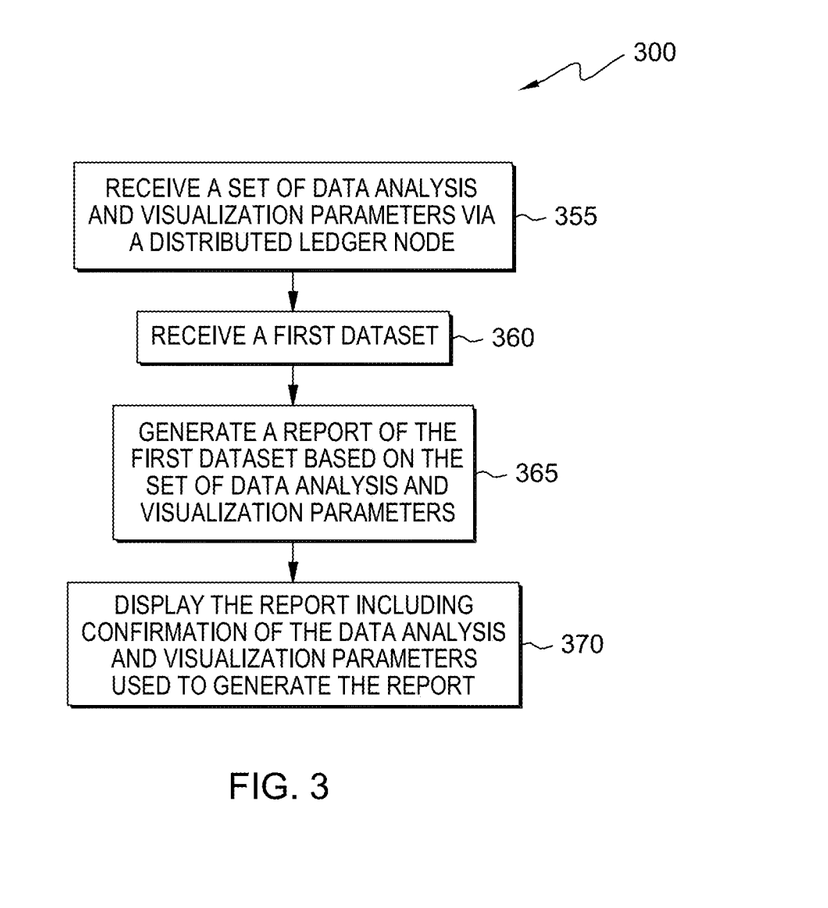
FIG. 3 is a flowchart depicting operational steps of a real-time reporting program for consistent reporting of derived data, in accordance with an embodiment of the present invention.

Real-time reporting program 106 is depicted and described in further detail with respect to FIG. 3. Referring to flowchart 300, real-time reporting program 106 generates a report of a first dataset based on the set of data analysis and visualization parameters stored on blockchain nodes 110.

Processing begins at operation 355, where real-time reporting program 106 receives a set of data analysis and visualization parameters via a distributed ledger node. In some embodiments of the present invention, the set of data analysis and visualization parameters includes parameters such as metrics, thresholds, collection periods, data validations, data derivations, data persistence, data purging, and reporting characteristics further including consistent axis, scale, and display criteria. In some embodiments, the data analysis and visualization parameters are received as configuration parameters for real-time reporting program 106 or any other real-time reporting architecture. In other embodiments, the data analysis and visualization parameters are received as a configuration file for real-time reporting program 106 or any other real-time reporting architecture. In other embodiments, the data analysis and visualization parameters are received as a hash function of a configuration file containing the configuration parameters for real-time reporting program 106 or any other real-time reporting architecture.

Continuing the exemplary embodiment, if chart 402 is verified to be consistent with the smart contract rules related to the smart contract, real-time reporting program 106 stores the set of data analysis and visualization parameters in blockchain nodes 110.

Processing continues at operation 360, where real-time reporting program 106 receives a first dataset. In some embodiments of the present invention, the first dataset is stored on database 108. In some embodiments, the first dataset is shared between one or more parties. In some embodiments, the first dataset includes derived data from data stored in database 108 and/or blockchain nodes 110.

In the exemplary embodiment, real-time reporting program 106 receives a first dataset corresponding to the SLAs between Company A and Company X. As agreed by both companies, the first dataset includes a table of succeeded SLAs and non-compliant SLAs by date. In particular, the first dataset includes a table of succeeded SLAs and non-compliant SLAs between Sep. 1, 2017 and Sep. 26, 2017.

Processing proceeds at operation 365, where real-time reporting program 106 generates a report of the first dataset based on the set of data analysis and visualization parameters. In some embodiments of the present invention, real-time reporting program 106 uses the configuration parameters corresponding to the set of data analysis and visualization parameters stored in the blockchain nodes 110. In other embodiments, real-time reporting program 106 verifies that the UID or UUID of the configuration file containing the set of data analysis and visualization parameters corresponds to the UID or UUID stored in blockchain nodes 110.

Continuing the exemplary embodiment, real-time reporting program 106 generates report 500 (see FIG. 5) of the table of succeeded SLAs and non-compliant SLAs between Sep. 1, 2017 and Sep. 26, 2017. Report 500 includes chart 502 generated based on the set of data analysis and visualization parameters of chart 402.

Processing continues at operation 370, where real-time reporting program 106 displays the report including confirmation of the set of data analysis and visualization parameters used to generate the report. In some embodiments of the present invention, the confirmation of the set of data analysis and visualization parameters used to generate the report is included in the report as metadata.

Figure 5:
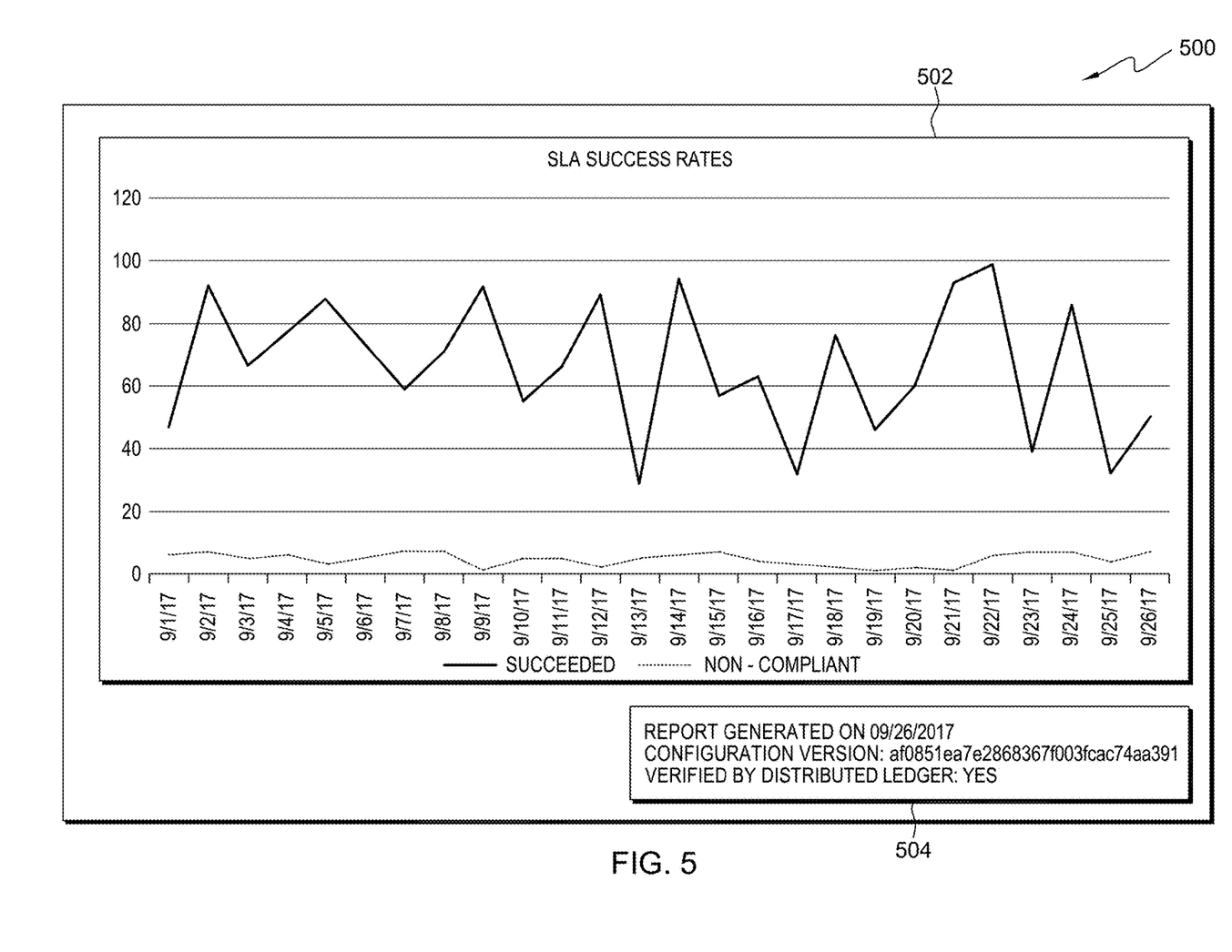
FIG. 5 is an exemplary diagram illustrating an aspect of consistent reporting, in accordance with an embodiment of the present invention.

Continuing the exemplary embodiment, report 500 generated by real-time reporting program 106 further includes report information 504 containing the date of the report, a UID or UUID representing the configuration version used, and a confirmation that the set of data analysis and visualization parameters used to generate report 500 correspond to the set of data analysis and visualization parameters stored in the blockchain nodes 110.

Figure 6:
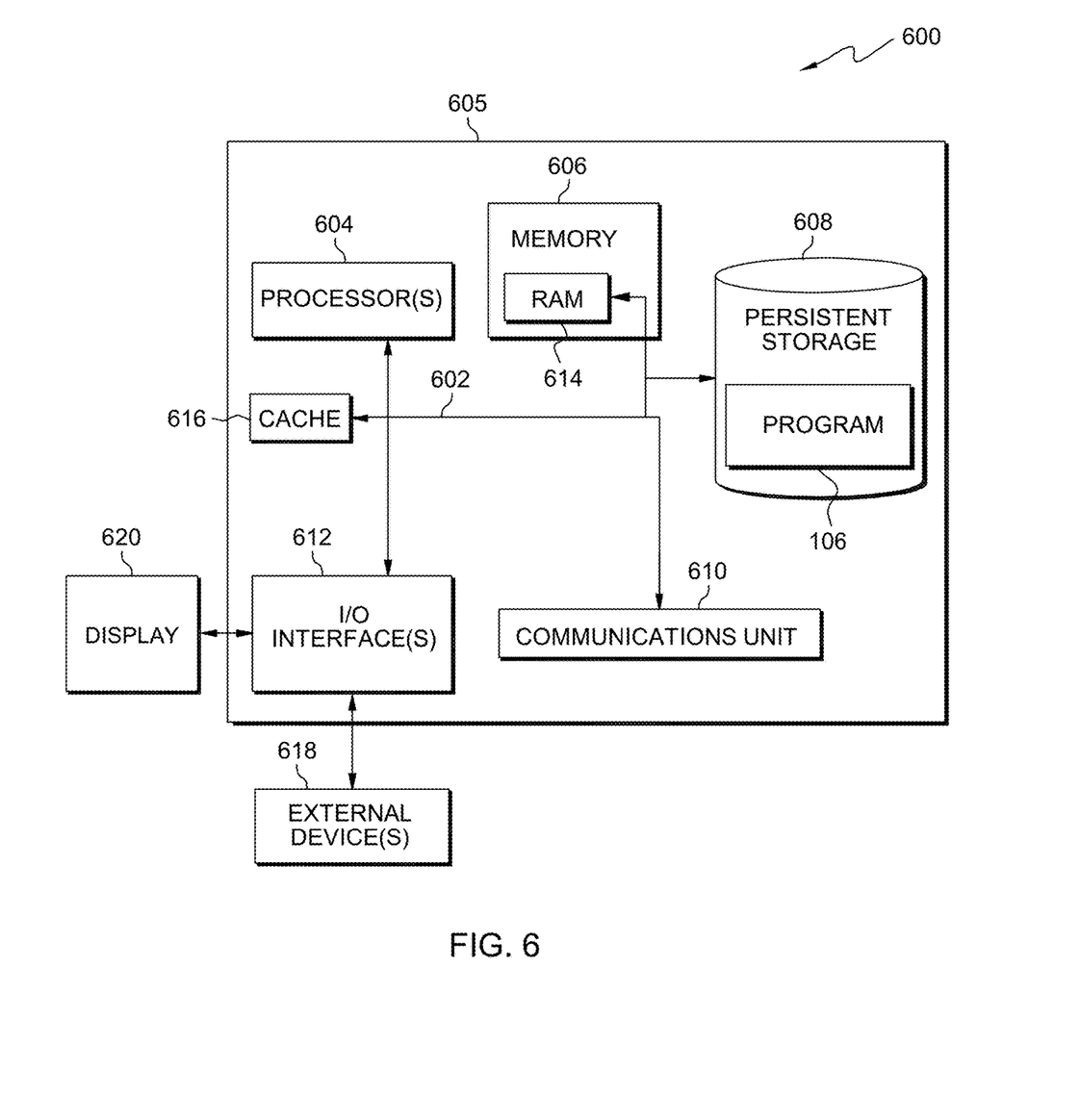
FIG. 6 depicts a block diagram of components of the server computer executing the user identification program within the distributed data processing environment of FIG. 1, in accordance with an embodiment of the present invention.

FIG. 6 depicts a block diagram 600 of components of server computer 104 within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computing device 605 and server computer 104 include communications fabric 602, which provides communications between computer processor(s) 604, memory 606, persistent storage 608, communications unit 610, and input/output (I/O) interface(s) 612.

Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Real-time reporting program 106 is stored in persistent storage 608 for execution by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of distributed data processing environment 100. In these examples, communications unit 610 includes one or more network interface cards. Communications unit 610 may provide communications through the use of either or both physical and wireless communications links. Real-time reporting program 106 may be downloaded to persistent storage 608 through communications unit 610.

I/O interface(s) 612 allows for input and output of data with other devices that may be accessible to computing device 605 and server computer 104, such as blockchain nodes 110, and other computing devices (not shown). For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., real-time reporting program 106 can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method, comprising:
    receiving, by one or more processors, a request to include a set of data analysis and visualization parameters in a distributed ledger;
    determining, by one or more processors, whether the set of data analysis and visualization parameters is consistent with a set of pre-determined rules recorded in the distributed ledger;
    responsive to determining that the set of data analysis and visualization parameters is consistent with the set of pre-determined rules recorded in the distributed ledger, storing, by one or more processors, the set of data analysis and visualization parameters in the distributed ledger; and
    generating, by one or more processors, a report of a first dataset based on the set of data analysis and visualization parameters.

2. The method of claim 1, wherein generating a report of a first dataset based on the set of data analysis and visualization parameters comprises:
    receiving, by one or more processors, the set of data analysis and visualization parameters from a distributed ledger;
    receiving, by one or more processors, a first dataset, wherein the first dataset includes at least one derived data;
    generating, by one or more processors, a report of the first dataset based on the set of data analysis and visualization parameters; and
    displaying, by one or more processors, the report including confirmation of the set of data analysis and visualization parameters used to generate the report.

3. The method of claim 2, wherein the confirmation of the set of data analysis and visualization parameters used to generate the report includes the date of the report, a unique id representing a version of the set of data analysis and visualization parameters, and a confirmation that the set of data analysis and visualization parameters used to generate the report correspond to the set of data analysis and visualization parameters stored in the distributed ledger.

4. The method of claim 1, wherein the set of data analysis and visualization parameters includes: (i) metrics; (ii) thresholds; (iii) collection periods; (iv) data validations; (v) data derivations; (vi) data persistence; (vii) data purging; and (viii) reporting characteristics.

5. The method of claim 1, wherein the distributed ledger is replicated across a plurality of computers and includes respective access permissions for each of the plurality of computers.

6. The method of claim 1, wherein the distributed ledger is a blockchain fabric distributed ledger.

7. The method of claim 1, wherein the set of data analysis and visualization parameters are enforced by a smart contract stored in the distributed ledger.

8. A computer program product, comprising:
    one or more computer readable storage devices and program instructions stored on the one or more computer readable storage devices, the stored program instructions comprising:
        program instructions to receive a request to include a set of data analysis and visualization parameters in a distributed ledger;
        program instructions to determine whether the set of data analysis and visualization parameters is consistent with a set of pre-determined rules recorded in the distributed ledger;
        program instruction to, responsive to determining that the set of data analysis and visualization parameters is consistent with the set of pre-determined rules recorded in the distributed ledger, store the set of data analysis and visualization parameters in the distributed ledger; and
        program instructions to generate a report of a first dataset based on the set of data analysis and visualization parameters.

9. The computer program product of claim 8, wherein the program instructions to generate a report of a first dataset based on the set of data analysis and visualization parameters comprise:
    program instructions to receive the set of data analysis and visualization parameters from a distributed ledger;
    program instructions to receive a first dataset, wherein the first dataset includes at least one derived data;
    program instructions to generate a report of the first dataset based on the set of data analysis and visualization parameters; and program instructions to display the report including confirmation of the set of data analysis and visualization parameters used to generate the report.

10. The computer program product of claim 9, wherein the confirmation of the set of data analysis and visualization parameters used to generate the report includes: (i) the date of the report; (ii) a unique id representing a version of the set of data analysis and visualization parameters; and (iii) a confirmation that the set of data analysis and visualization parameters used to generate the report correspond to the set of data analysis and visualization parameters stored in the distributed ledger.

11. The computer program product of claim 8, wherein the set of data analysis and visualization parameters includes: (i) metrics; (ii) thresholds; (iii) collection periods; (iv) data validations; (v) data derivations, (vi) data persistence; (vii) data purging; and (viii) reporting characteristics.

12. The computer program product of claim 8, wherein the distributed ledger is replicated across a plurality of computers and includes respective access permissions for each of the plurality of computers.

13. The computer program product of claim 8, wherein the distributed ledger is a blockchain fabric distributed ledger.

14. The computer program product of claim 8, wherein the set of data analysis and visualization parameters are enforced by a smart contract stored in the distributed ledger.

15. A computer system, comprising:
one or more computer processors;
one or more computer readable storage devices;
program instructions stored on the one or more computer readable storage devices for execution by at least one of the one or more computer processors, the stored program instructions comprising:
program instructions to receive a request to include a set of data analysis and visualization parameters in a distributed ledger;
program instructions to determine whether the set of data analysis and visualization parameters is consistent with a set of pre-determined rules recorded in the distributed ledger;
program instruction to, responsive to determining that the set of data analysis and visualization parameters is consistent with the set of pre-determined rules recorded in the distributed ledger, store the set of data analysis and visualization parameters in the distributed ledger; and
program instructions to generate a report of a first dataset based on the set of data analysis and visualization parameters.

16. The computer system of claim 15, wherein the program instructions to generate a report of a first dataset based on the set of data analysis and visualization parameters comprise:
program instructions to receive the set of data analysis and visualization parameters from a distributed ledger;
program instructions to receive a first dataset, wherein the first dataset includes at least one derived data;
program instructions to generate a report of the first dataset based on the set of data analysis and visualization parameters; and
program instructions to display the report including confirmation of the set of data analysis and visualization parameters used to generate the report.

17. The computer system of claim 16, wherein the confirmation of the set of data analysis and visualization parameters used to generate the report includes: (i) the date of the report; (ii) a unique id representing a version of the set of data analysis and visualization parameters; and (iii) a confirmation that the set of data analysis and visualization parameters used to generate the report correspond to the set of data analysis and visualization parameters stored in the distributed ledger.

18. The computer system of claim 15, wherein the set of data analysis and visualization parameters includes: (i) metrics; (ii) thresholds; (iii) collection periods; (iv) data validations; (v) data derivations; (vi) data persistence; (vii) data purging; and (viii) reporting characteristics.

19. The computer system of claim 15, wherein the distributed ledger is replicated across a plurality of computers and includes respective access permissions for each of the plurality of computers.

20. The computer system of claim 15, wherein the distributed ledger is a blockchain fabric distributed ledger.

* * * * *